US006938528B2

(12) United States Patent
Lewis

(10) Patent No.: US 6,938,528 B2
(45) Date of Patent: Sep. 6, 2005

(54) METHOD AND APPARATUS FOR STABILIZING A WORKPIECE

(76) Inventor: Thomas M. Lewis, 141 Cricket La., Orange, CT (US) 06477

( * ) Notice: Subject to any disclaimer, the term of this patent is extended or adjusted under 35 U.S.C. 154(b) by 0 days.

(21) Appl. No.: 10/222,232

(22) Filed: Aug. 15, 2002

(65) Prior Publication Data

US 2003/0140745 A1 Jul. 31, 2003

Related U.S. Application Data

(60) Provisional application No. 60/352,985, filed on Jan. 30, 2002.

(51) Int. Cl.[7] .............................. B26D 7/02; B23Q 3/00

(52) U.S. Cl. .......................... 83/13; 83/435.12; 83/465; 83/466.1; 83/468.7; 269/303; 269/319

(58) Field of Search ................................ 269/303, 304, 269/319, 36, 86, 90, 203; 83/462, 468.7, 471.3, 409, 465, 454, 466.1, 581, 781, 477.1; D7/631; 248/122.1; 312/317.1, 317.2, 317.3

(56) References Cited

U.S. PATENT DOCUMENTS 715,326 A * 12/1902 Walling ....................... 269/78
752,406 A * 2/1904 Nichols ....................... 83/766
767,876 A * 8/1904 Eichblatt ..................... 269/90
821,959 A * 5/1906 Oxnam ........................ 83/761
1,798,342 A * 3/1931 Trepte ........................ 269/303
3,124,175 A * 3/1964 McCloud ..................... 33/443
3,397,722 A * 8/1968 Long ........................... 83/762
4,164,882 A * 8/1979 Mericle ....................... 83/409
4,281,827 A * 8/1981 Horwath ...................... 83/581
4,300,755 A * 11/1981 Potvin ....................... 269/87.2
4,466,601 A * 8/1984 Raines ....................... 269/303
4,693,156 A * 9/1987 Olvera ....................... 269/304
4,743,004 A * 5/1988 Kloss ......................... 269/303
4,875,399 A * 10/1989 Scott et al. ................ 83/468.3
5,109,742 A * 5/1992 Strong ......................... 83/421
5,146,826 A * 9/1992 Shiotani et al. ............ 83/468.2
5,226,345 A * 7/1993 Gamble ....................... 83/745
5,239,905 A * 8/1993 Dunn .......................... 83/459
5,560,273 A * 10/1996 Keddie ........................ 83/581
5,605,086 A * 2/1997 Huang-Mo et al. ........... 83/781
5,617,909 A * 4/1997 Duginske ................. 144/253.1
5,692,426 A * 12/1997 Alexander .................. 83/466
5,730,434 A * 3/1998 Schoene et al. .............. 83/464
5,791,213 A * 8/1998 Young ........................ 269/203
5,819,623 A * 10/1998 Sasaki et al. ............. 83/468.2
5,943,930 A * 8/1999 Fasske ........................ 83/465
6,481,320 B1 * 11/2002 McGrory et al. .............. 83/13
6,543,323 B2 * 4/2003 Hayashizaki et al. ......... 83/466
6,591,724 B2 * 7/2003 Huang ....................... 83/468.3
6,782,782 B1 * 8/2004 Shangle et al. ............... 83/581
6,848,350 B2 * 2/2005 Brazell et al. ........... 83/435.11
2004/0217532 A1 * 11/2004 Eberle, III .................. 269/203

* cited by examiner

*Primary Examiner*—Allan N. Shoap
*Assistant Examiner*—Jason Prone
(74) *Attorney, Agent, or Firm*—Christopher J. Capelli

(57) ABSTRACT

An apparatus for supporting a molding article that is to be cut by a sawing device. The apparatus includes a bottom supporting surface having opposing front and rear edges and opposing first and second side edges. A first wall is included that is upstanding from the rear edge of the bottom supporting surface and substantially extends between the opposing first and second side edges of the bottom supporting surface. A second wall is upstanding from the bottom surface and at a location intermediate the first wall and the front edge of the bottom supporting surface. The second wall preferably extends between the opposing first and second side edges of the bottom supporting surface. Also preferably included is an adjustment assembly operatively associated with the bottom supporting surface and the second wall

17 Claims, 7 Drawing Sheets

METHOD AND APPARATUS FOR STABILIZING A WORKPIECE

This application claims priority to U.S. Provisional Patent Application Ser. No. 60/352,985, filed Jan. 30, 2002, entitled, "Method and Apparatus For Stabilizing A Workpiece".

BACKGROUND OF THE INVENTION

1. Field of the Invention

The present invention relates in general to an apparatus for accurately positioning and stabilizing a work piece in relation to a working tool, and more particularly to a miter guide for table saws or other cutting or shaping tools, such as those used in woodworking.

2. Description of the Related Art

As is well known in the art, miter boxes are utilized for making angled saw cuts in wooden boards and other workpieces. Miter boxes are well known and well developed in the prior art. The prior art discloses constructions which range from the very simple, including a true slotted box construction from which the name derives, to the very complex including sophisticated locating, alignment and clamping devices.

A typical illustration of the problem involved in sawing members with an accurate cut on the end which is sometimes referred to as mitering, involves the installation of base mold and ceiling mold which are the decorative strips of wood running along the junction between the floor and the wall or the wall and the ceiling. Front mitering is where the corner of the wall sticks out into the room whereas back mitering involves the junction of the recessed corner of the wall adjacent the next wall and the ceiling. Mitering is a sometimes tedious process involving careful measurements and very accurate sawing and is seldom accomplished in a very expert manner except by highly paid cabinet makers and craftsmen and the mistakes sometimes result in the loss of significant lengths of expensive mold. One method is done with a coping saw and a mitering saw and is tedious and time consuming. For this reason, some front and back mitering is done in basically a very poor manner and the mistakes are covered by putty, plastic wood and caulking material. However, due to the changes in color and discoloration which occur from painting or staining the caulking material is often apparent and the poor job is obvious upon inspection. It is very difficult for an ordinary amateur homeowner or the like to acquire the necessary expertise to perform accurate mitering even with the best of mitering equipment.

It is possible to buy, rent or borrow expensive and fine mitering equipment but the equipment alone with not cause a proper job. One reason is that the use of a miter box presents the problem of properly positioning a board to be cut at an acute vertical angle from the horizontal miter box table when it is desired to make a compound angular cut. For example, when making a 45 degree, mitered saw cut in pieces of cove molding to be joined in the corner of a room, the molding piece must be positioned in the miter box at the same angle with respect to the horizontal table and vertical backstop that the molding will assume when affixed to the wall and ceiling.

One attempt to overcome the above-noted drawbacks of the prior art is disclosed in U.S. Pat. No. 5,560,273, which describes an apparatus for supporting a board on a conventional miter box in an acute vertical angular position with respect to the horizontal miter box table and the vertical backstop wall includes a plurality of hole pairs formed in the surface of the miter box table, each of which hole pairs lies on a line parallel to the backstop wall. A board stop having a linear abutment surface includes a pair of downwardly depending legs which are sized and spaced to be received in one of the hole pairs in a manner to position to abutment surface parallel to the lines and to the backstop wall. Each of the holes pairs is located at a predetermined distance from the backstop wall to permit the board, when positioned with one edge against the abutment surface and the undersurface adjacent the edge resting on the horizontal upper supporting edge of the backstop wall, to be located in a selected acute angular position. Each of the hole pairs is offset with respect to the next adjacent hole pair in the direction of the lines which are defined by said pairs. The board stop preferably includes a pair of generally parallel abutment surfaces on opposite sides with the pair of legs disposed more closely adjacent one of said surfaces than the other. The horizontal table surface is preferably provided with identical sets of hole pairs on opposite sides of the centerline of the box, and a board stop is provided for each hole pair. In an alternate embodiment, individual one-legged board stops may be utilized instead of the elongate two-legged stop.

However, noted drawbacks of this patent is that it still does not securely hold a workpiece within its securing walls and actually requires locking bars to secure a workpiece. Also, neither of the securing walls are adjustable to accommodate a wide range of different sized workpieces. Further, the securing walls for a workpiece are dedicated to a miter saw specifically configured for and are not interchangeable with other sawing apparatus. Thus, in order for one to utilize the advantages of this device, one must purchase a miter saw incorporating the subject invention, even though the typically consumer already owns a miter saw he or she is happy and comfortable with.

SUMMARY OF THE INVENTION

The subject invention relates to an apparatus for supporting a molding article that is to be cut by a sawing device. The apparatus includes a bottom supporting surface having opposing front and rear edges and opposing first and second side edges. A first wall is included that is upstanding from the rear edge of the bottom supporting surface and substantially extends between the opposing first and second side edges of the bottom supporting surface. A second wall is upstanding from the bottom surface and at a location intermediate the first wall and the front edge of the bottom supporting surface. The second wall preferably extends between the opposing first and second side edges of the bottom supporting surface. Also preferably included is an adjustment assembly operatively associated with the bottom supporting surface and the second wall The adjustment assembly is operable to cause lateral translation of the second wall between the first wall and the front edge of the bottom supporting surface thereby creating a spaced distance between the first and second walls suitable to accommodate the molding article that is to be cut by a sawing device.

BRIEF DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PREFERRED EMBODIMENT

Figure 1:
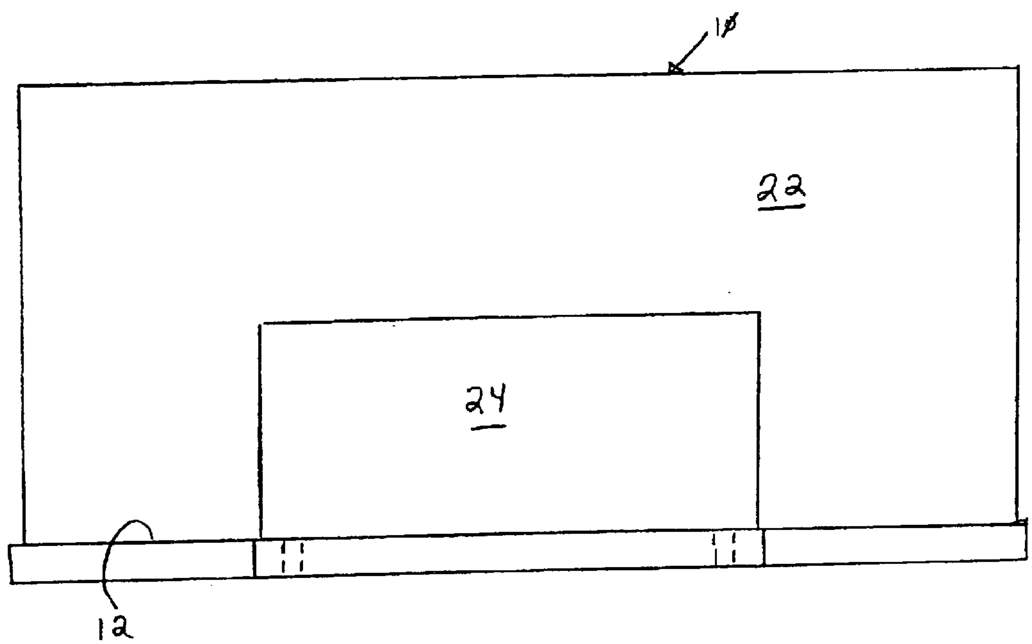
FIG. 1 is a front planar view of the present invention.
Figure 2:
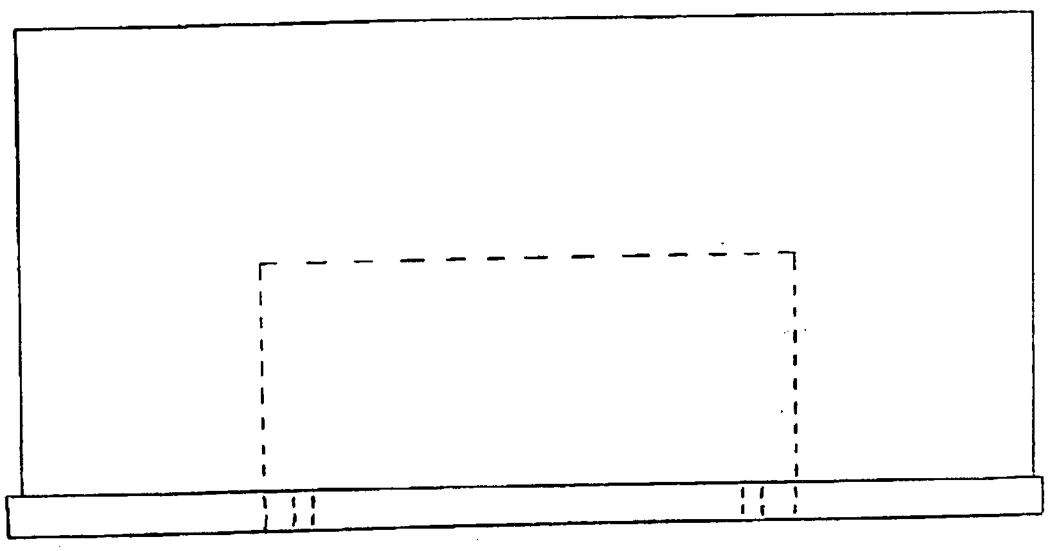
FIG. 2 is a back planar view of the present invention.

In describing the present invention, reference is made to the drawings, wherein there is seen in FIG. 1 a front view of the present invention, generally designated 10, which generally is an infinitely adjustable device, within defined boundaries, for securing a workpiece. For ease of description of a preferred embodiment of device 10, device 10 is to be hereinafter described in reference to a device 10 for securing a piece of crown molding 200 (FIG. 7), which device 10 is to be used in cooperation with a prior art miter sawing apparatus 100 (FIG. 6) used for making compound angular cuts in a piece of crown molding at the exact angle it will be installed, amongst other uses. It is to be appreciated that while the below described device 10 is described in reference to securing a piece of crown molding and is used in cooperation with a prior art miter sawing apparatus 100, the device 10 is not to be understood to be limited to such applications (i.e., securing a piece of crown molding so as to be cut in a cooperating and separate miter box). It is only for clarity of understanding of device 10 that the preferred embodiment of sorting device 10 is described in conjunction with a piece of crown molding and separate prior art miter sawing apparatus 100.

With reference now to the drawings, description of the present invention device 10 will now be made with reference to FIGS. 1–5 depicting various planar views of device 10.

Figure 5:
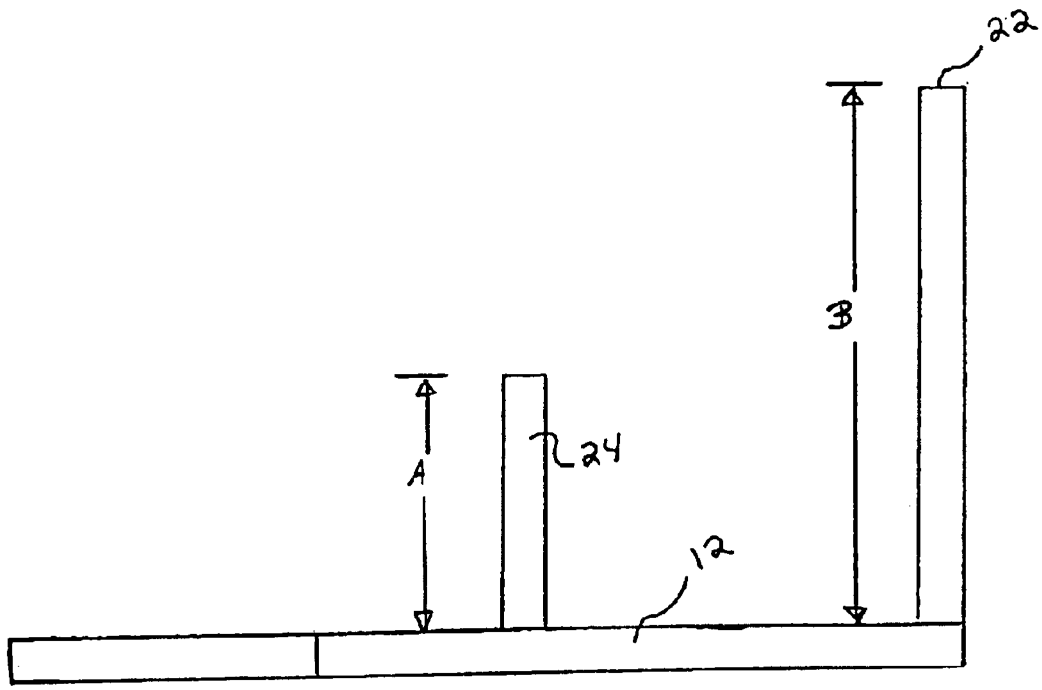
FIG. 5 is a side planar view of the present invention.
Figure 7:
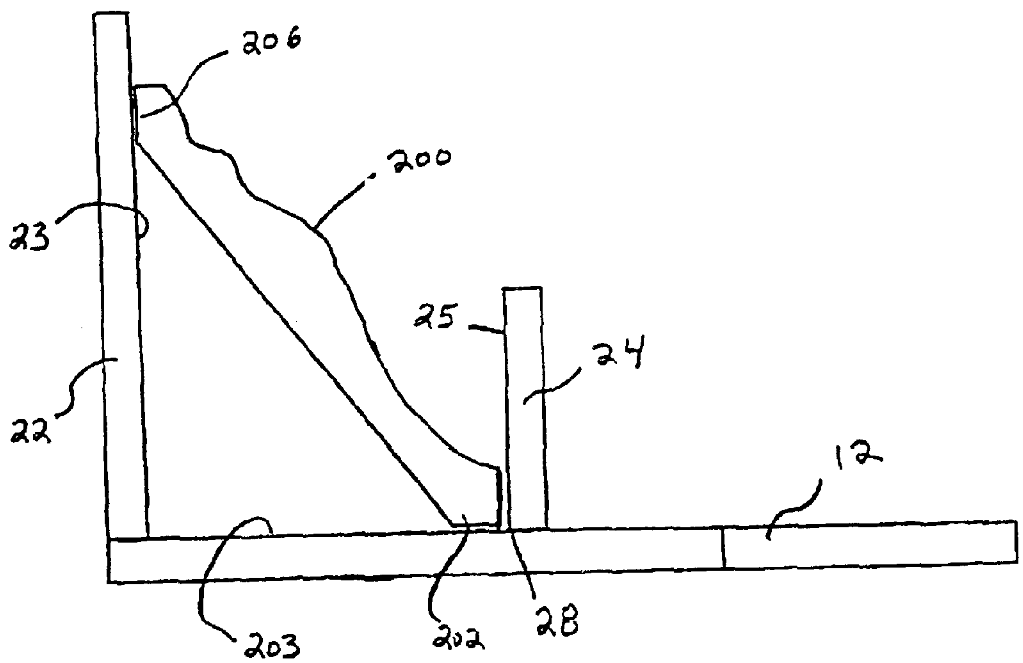
FIG. 7 is a side planar view of the present invention of FIG. 1 stabilizing a workpiece.

Device 10 comprises a bottom wall 12 having opposing front 14 and rear 16 edges as well as opposing side edges 18,20. Upstanding from the bottom wall 12 is a back wall 22 extending upwardly from the rear edge 16 of back wall 22 and preferably extending between the side edges 18,20. Back wall 22 is disposed at preferably a 90-degree angle with respect to the bottom wall 12. Also upstanding from the bottom wall 12 is a front wall 24 extending upwardly from a location intermediate the front 14 and rear edges 16. Like the back wall 22, front wall is preferably disposed at a 90-degree angle with respect to the bottom wall 12. As will be discussed below, device 10 includes an infinitely adjustment mechanism 26 for facilitating sliding movement of the front wall 24 on the bottom wall 12 relative to the back wall 22. In other words, the front wall 24 is disposed at an adjustable distance relative to the rear edge 16 of the bottom wall 22, via adjustment mechanism 26. Regardless of the distance the front wall 24 is disposed from the back wall 22, both walls 22,24 are preferably to remain spaced parallel relative to one another. As is best shown in FIG. 5, front wall 24 has a height "A" which is preferably smaller than the height "B" of the back wall 22. This is because in use of device 10 (as is shown in FIG. 7), a piece of crown molding 200 is angularly disposed in device 10 such that a first edge 202 of the molding 204 is disposed in abutment with the cornered-edge 28 formed between the front wall 24 and bottom wall 12 while the second opposing edge 206 of the molding 200 is disposed against a portion of the back wall 22, which position is distal from the bottom wall 12. Thus, in the preferred embodiment, the height "A" of the front wall 24 need only be sufficient to secure the first edge 202 of a piece of molding 200. However, it is to be understood that the height "A" of the front wall 24 is not to be understood to be limited to be smaller than the height "B" of the back wall 22, but rather could be equal or larger than the height "B" of the back wall 22.

Figure 4:
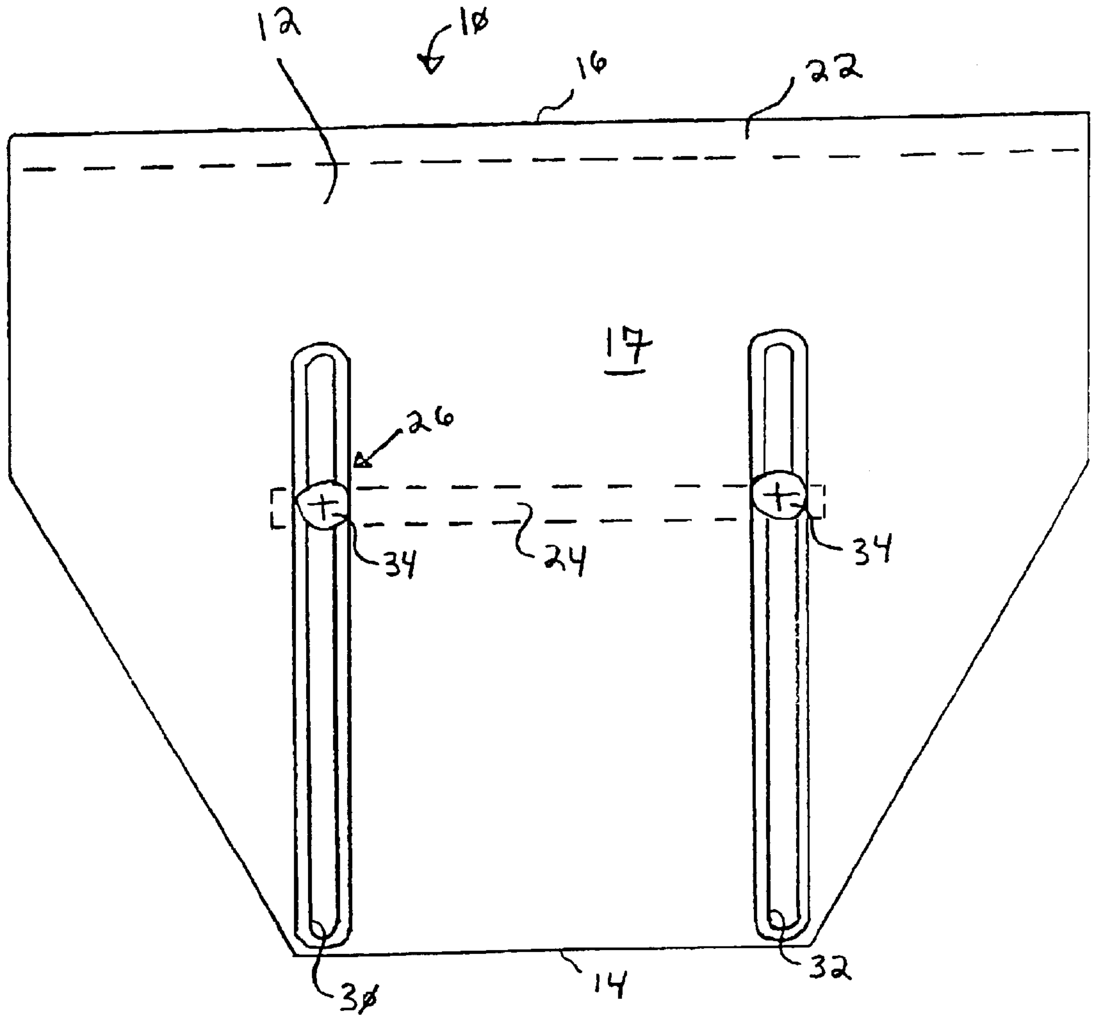
FIG. 4 is a bottom planar view of the present invention.

As best seen in FIG. 4, the aforementioned adjustment mechanism 26 preferably comprises first and second elongate cutout portions 30,32 formed in the bottom wall 12 with each extending from the front edge 14 of the bottom wall 12 to a spaced distance from the rear edge 16 of the bottom wall 12. The first and second elongate cutout portions 30,32 are preferably disposed parallel to one another on the bottom wall 12 of device 10. Positioned within each first and second elongate cutout portion 30,32 is a respective setscrew 34 each extending through a respective elongate cutout portion 30,32 from the bottom surface 17 of the bottom wall 12 and upwardly from the upper surface 15 of the bottom wall 12. The portion of each setscrew 34 extending from the upper surface 15 of the bottom wall 12 is adjustably secured in the bottom edge of the front wall 24. Hence, when the setscrews are tightened into the bottom edge of the front wall 24, the front wall 24 is then securely positioned at a fixed position from the rear wall 22. As is obvious, tightening of the setscrews 34 can be achieved though many known prior art means, such as slotted head screws, Phillips headed screws, hexagonal headed screws, and etc. And when each set screw 34 is loosened a sufficient amount, the front wall 24 is enabled to translate on the bottom wall 12 along the axis' defined by the first and second elongate cutout portions 30,32. Thus, when the user determines the desired spaced relationship required between the rear wall 16 and front wall 24 so as to accommodate a workpiece (as described further below), the user merely needs to tighten each setscrew 34 to securely maintain that spaced relationship.

Figure 3:
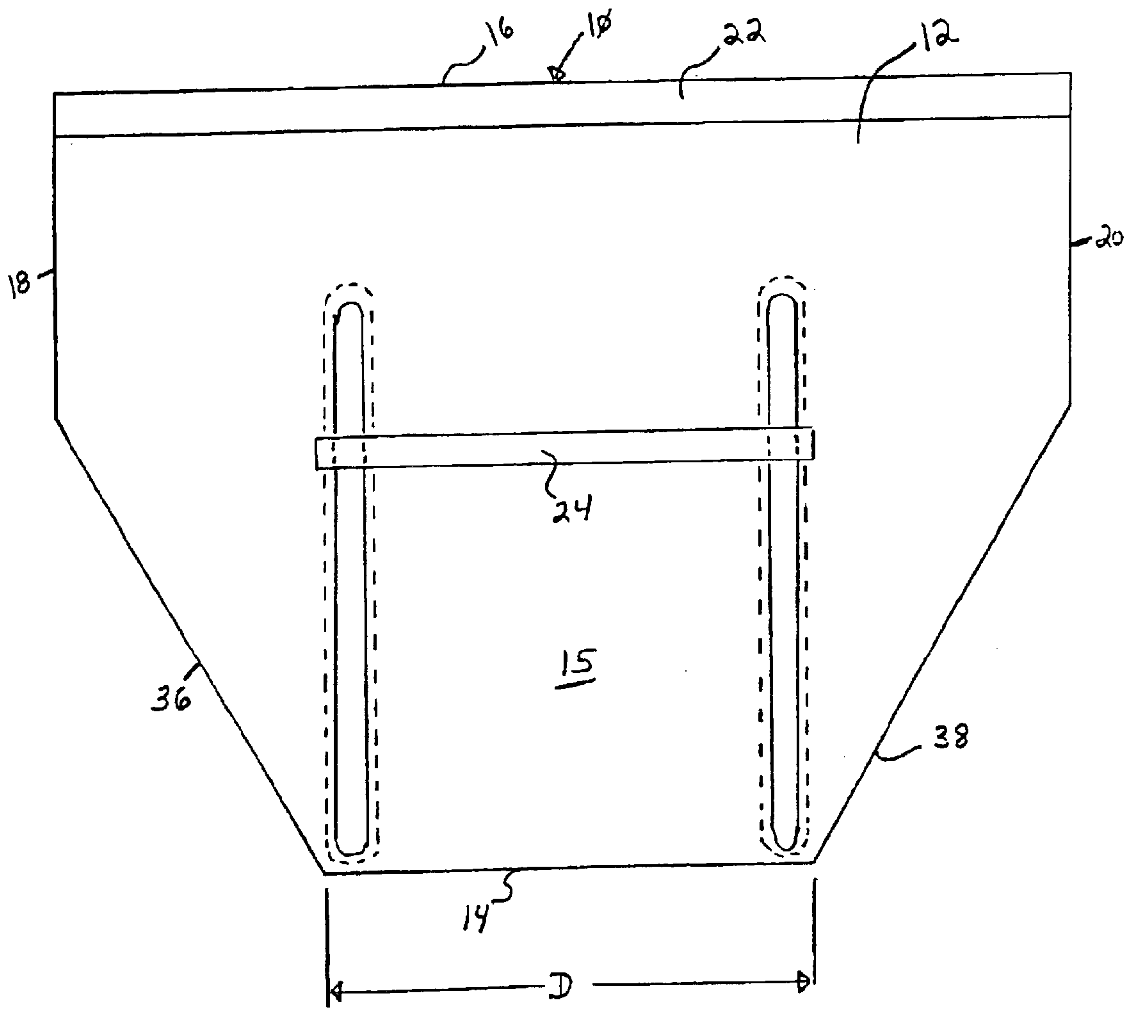
FIG. 3 is a top planar view of the present invention.
Figure 6:
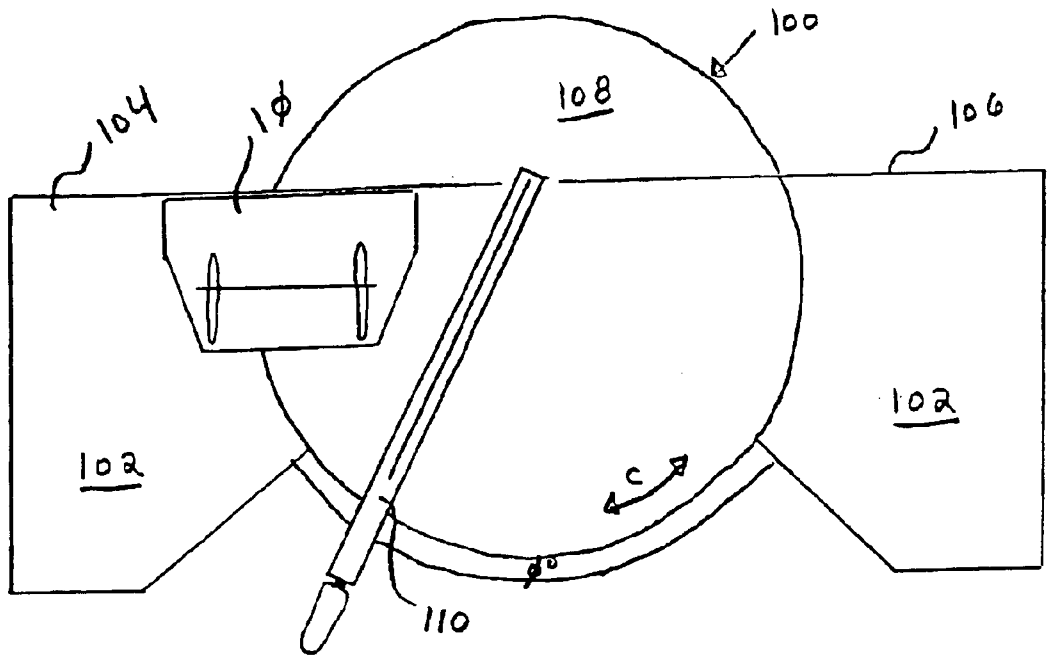
FIG. 6 is a top planar view of the present invention of FIG. 1 positioned for use with a prior art miter sawing apparatus.

As is best seen in FIGS. 3 and 4, the bottom wall 12 of device 10 is preferably formed with angled corners 36 and 38 extending between the front edge 14 of bottom wall 12 and each respective side portion 18 and 20. It is noted that an advantage of the formation of the angled corners 36,38 enable device 10 to be located in close proximity to a miter sawing apparatus 100 without the miter sawing apparatus 100 intersecting with a portion of the bottom wall 12, as is shown in FIG. 6. Preferably, the front wall 24 extends a distance equal to the distance "D" that extends between the angled corners 36,38 on the bottom wall 12.

With the structure of the workpiece stabilizing device 10 being described above, its method of operation will now be described.

With reference now to FIG. 6, there is shown a prior art miter sawing apparatus designated generally by reference numeral 100. Since such miter sawing apparatus are well known in the art only a brief description of the miter sawing apparatus is to be provided so as to enable one skilled in the art to understand the usage of the present invention workpiece stabilizer 10.

Miter sawing apparatus 100 includes a base portion 102 having a left side portion 104 and a right side portion 106, with each side portion 104,106 providing a platform for supporting a workpiece (e.g., a piece of crown molding 200) to be cut by its sawing apparatus 110. As is well known, sawing apparatus 110 provides for cantilevering movement in a typical upward-downward motion and is preferably coupled to a motor (not shown) for providing circular movement of a cutting blade (not shown) mounted within sawing apparatus 110. Sawing apparatus 110 is mounted on a rotatable base 108 which is substantially co-planar with the base portion 102 of sawing apparatus 100. As is also known, the rotating movement of base 108 along arrow "C" provides for predetermined angled cuts in a workpiece 200 supported on the base portion 102 of the miter sawing apparatus 100.

In use, the present invention workpiece stabilizing apparatus 10 is preferably disposed atop the base portion 102 of sawing apparatus 100 and is disposed either adjacent its left or right side portion 104,106. As is shown in FIG. 6, the workpiece stabilizing apparatus 10 is disposed atop the left side portion 104 of sawing apparatus 100 with a portion of the workpiece stabilizing device 10 also be disposed atop the rotatable base 108 of sawing apparatus 100.

With reference now to FIG. 7, and with the understanding that the workpiece stabilizing apparatus 10 is disposed atop the base portion of the sawing apparatus 100 as shown in FIG. 6, description of the positioning of a workpiece 200 in the workpiece stabilizing apparatus 10 will now be provided. It is to also be understood that workpiece 100 will be shown and described in terms of a piece of crown molding, but the workpiece stabilizing apparatus 10 is not be limited to such a type of workpiece 100 but rather may be utilized with any type of workpieces typical cut by a workpiece stabilizing apparatus 10.

As is shown in FIG. 7, a piece of crown molding 200 is angularly disposed in workpiece stabilizing apparatus 10 such that a first side edge 202 of the piece of crown molding 200 is in secure abutment within the corner 28 formed between the inner surface 25 of the front wall 24 and the top surface 203 of the bottom wall 12 of workpiece stabilizing apparatus 10. The flat portion 206 of the opposing second side edge of the crown molding piece 200 is disposed, preferably in co-planar relationship, with the inner surface 23 of the back wall 22. Thus, a portion of the crown molding workpiece 200 that extends beyond a side edge 18,20 of the workpiece stabilizing apparatus 10 may be securely cut by the miter sawing apparatus at a desired point of which intersects the cutting plane of the saw 110 of miter sawing apparatus 100.

Thus, some noted advantages of the present invention are that it enables a user to securely hold and cut crown molding at the same angle as it is to be installed on a wall. In other words device 10 automatically attains the proper angle to be cut on the crown molding. Thus, device 10 eliminates the need for reference marks on saw frames. Further, device 10 eliminates the need for a compound miter saw since bevel angle cuts are no longer needed. The infinite adjustability of the front wall 24 on the bottom wall 12 enables device ,10 to be adjustable to accommodate a wide range of sizes for crown molding pieces.

While the present invention has been disclosed and described with reference to a single embodiment thereof, it will be apparent, as noted above that variations and modifications may be made therein. It is also noted that the present invention is independent of a miter sawing apparatus, and is not limited to any physical integration with such a miter sawing apparatus. It is, thus, intended in the following claims to cover each variation and modification that falls within the true spirit and scope of the present invention.

What is claimed is:

1. An apparatus for supporting a molding article that is to be cut by a sawing device having a top cutting surface, the apparatus comprising:

a bottom surface separate from the top cutting surface of the sawing device having opposing front and rear edges and opposing first and second side edges and dimensioned to be disposed upon the top cutting surface of the sawing device, wherein the front edge of the bottom supporting surface is formed with tapered portions extending from each opposing side edge and the front edge of the bottom supporting surface;

a first wall upstanding from the rear edge of the bottom surface and extending between the opposing first and second side edges of the bottom surface, said first wall defining a first planar supporting surface upstanding substantially perpendicular from said bottom surface;

a second wall upstanding from the bottom surface and at a location intermediate the first wall and the front edge of the bottom surface, the second wall extending between the opposing first and second side edges of the bottom surface and defining a second planar supporting surface upstanding substantially perpendicular from said bottom surface and facing said first planar surface in parallel relationship thereto; and an adjustment assembly operatively associated with the bottom surface and the second wall, the adjustment assembly permitting movement of the second wall between the first wall and the front edge of the bottom surface thereby creating a spaced distance between the first and second walls suitable to accommodate the molding article that is to be cut by a sawing device.

2. An apparatus as recited in claim 1, wherein the second wall extends between the opposing tapered portions on the bottom supporting surface when said second wall is positioned in close proximity to said front edge of said bottom surface.

3. An apparatus as recited in claim 1, wherein the adjustment assembly is configured to fixedly secure the second wall to a selected location on the bottom supporting surface between the first wall and the front edge of the bottom supporting surface.

4. An apparatus as recited in claim 3, wherein the adjustment assembly includes a locking mechanism extending through the bottom supporting surface and a bottom surface of the second wall.

5. An apparatus as recited in claim 3, wherein the adjustment assembly includes at least one set screw extending through an elongate cutout formed in the bottom supporting surface.

6. An apparatus as recited in claim 1, wherein the first wall is substantially perpendicularly disposed relative to the bottom supporting surface.

7. An apparatus as recited in claim 6, wherein the second wall is disposed substantially parallel to the first wall.

8. An apparatus as recited in claim 6, wherein the first wall upstands from the bottom supporting surface with a height that is greater than that of a height of the second wall upstanding from the bottom supporting surface.

9. A method for supporting a molding article that is to be cut by a miter sawing device having a top cutting surface and a fixed back wall extending upward from the top cutting surface of the miter sawing device, the method comprising the steps of:

providing a supporting apparatus including:

a bottom surface having opposing front and rear edges and opposing first and second side edges;

a first wall upstanding from the rear edge of the bottom surface and substantially extending between, and without going beyond the opposing first and second side edges of the bottom surface said first wall defining a first planar supporting surface upstanding substantially perpendicular from said bottom surface of said supporting apparatus;

a second wall upstanding from the bottom surface and at a location intermediate the first wall and the front edge of the bottom surface, the second wall extending between the opposing first and second side edges of the bottom surface and defining a second planar supporting surface upstanding substantially perpendicular from said bottom surface of said supporting apparatus and facing said first planar supporting surface in parallel relationship thereto; and an adjustment assembly operatively associated with the bottom surface and the second wall, the adjustment assembly permitting movement of the second wall between the first wall and the front edge of the bottom supporting thereby creating a spaced distance between the first and second walls suitable to accommodate the molding article that is to be cut by a sawing device;

disposing the supporting apparatus upon the miter sawing device such that the bottom surface of the supporting device is separately disposed atop the top cutting surface of the sawing device and the first wall of the supporting device is separately disposed against the fixed back wall of the miter sawing device;

disposing said molding article between a space provided between the first and second walls of the supporting apparatus such that a first edge of the molding article abuts against the first planar supporting surface and an opposing edge of the molding article rests against the second planar supporting surface in planar relationship thereto;

fixedly securing the second wall to the bottom surface of the supporting apparatus, via the adjustment assembly, such that the molding article is angular disposed between the first and second walls in substantially an angle as the molding article is desired to be disposed on a users wall;

having a portion of the molding article extending beyond one of the first or second edges of the bottom surface of the supporting apparatus that is desired to be cut; and maintaining the supporting apparatus in a fixed position atop said top cutting surface of said miter sawing device when said molding article is being cut by said miter sawing device.

10. An apparatus for supporting a molding article that is to be cut by a miter sawing device having a top cutting surface and a fixed back wall extending upward from the top cutting surface of the miter sawing device, the apparatus comprising:

a bottom surface separate from the top cutting surface of the sawing device having opposing front and rear edges and opposing first and second side edges and dimensioned to be separately disposed upon the top cutting surface of the sawing device and maintained in a fixed position atop said top cutting surface of said miter sawing device when said molding article is being cut by said miter sawing device, wherein the front edge of the bottom supporting surface is formed with tapered portions extending from each opposing side edge and the front edge of the bottom supporting surface;

a first wall upstanding from the rear edge of the bottom surface and extending between, and without going beyond, the opposing first and second side edges of the bottom surface and dimensioned to be separately disposed adjacent said fixed back wall of the miter sawing device and maintained in a fixed position adjacent said fixed back wall of said miter sawing device when said molding article is being cut by said miter sawing device and said first wall defining a first planar supporting surface upstanding substantially perpendicular from said bottom surface of said apparatus;

a second wall upstanding from the bottom surface and at a location intermediate the first wall and the front edge of the bottom surface, the second wall extending between the opposing first and second side edges of the bottom surface and defining a second planar supporting surface upstanding substantially perpendicular from said bottom surface and facing said first planar supporting surface in parallel relationship thereto; and an adjustment assembly operatively associated with the bottom surface and the second wall, the adjustment assembly permitting movement of the second wall between the first wall and the front edge of the bottom surface thereby creating a spaced distance between the first and second walls suitable to accommodate the molding article that is to be cut by a sawing device.

11. An apparatus as recited in claim 10, wherein the first wall is substantially perpendicularly disposed relative to the bottom supporting surface.

12. An apparatus as recited in claim 10, wherein the second wall extends between the opposing tapered portions on the bottom supporting surface when said second wall is positioned in close proximity to said front edge of said bottom surface.

13. An apparatus as recited in claim 10, wherein the second wall is disposed substantially parallel to the first wall.

14. An apparatus as recited in claim 13, wherein the first wall upstands from the bottom supporting surface with a height that is greater than that of a height of the second wall upstanding from the bottom supporting surface.

15. An apparatus as recited in claim 10, wherein the adjustment assembly is configured to fixedly secure the second wall to a selected location on the bottom supporting surface between the first wall and the front edge of the bottom supporting surface.

16. An apparatus as recited in claim 15, wherein the adjustment assembly includes a locking mechanism extending through the bottom supporting surface and a bottom surface of the second wall.

17. An apparatus as recited in claim 15, wherein the adjustment assembly includes at least one set screw extending through an elongate cutout formed in the bottom supporting surface.

* * * * *